United States Patent [19]

Wilson, Jr.

[11] Patent Number: 4,866,218

[45] Date of Patent: Sep. 12, 1989

[54] ELECTRIC FENCE INSULATOR ADAPTOR AND FENCE INSULATOR COMBINED THEREWITH

[75] Inventor: Robert M. Wilson, Jr., Battle Creek, Mich.

[73] Assignee: Dare Products, Inc., Battle Creek, Mich.

[21] Appl. No.: 251,291

[22] Filed: Sep. 30, 1988

[51] Int. Cl.[4] .......................... H01B 17/16; A01K 3/00

[52] U.S. Cl. .................................. 174/158 F; 174/171; 256/10

[58] Field of Search ............ 174/158 F, 161 F, 163 F, 174/168, 169, 170, 171, 175; 248/73; 256/10, 47, 48, 53

[56] References Cited

U.S. PATENT DOCUMENTS

| | | | |
|---|---|---|---|
| 4,077,611 | 3/1978 | Wilson | 174/163 F X |
| 4,599,488 | 7/1986 | Wilson, Jr. | 174/158 F |
| 4,680,428 | 7/1987 | Wilson, Jr. | 174/158 F |

*Primary Examiner*—Laramie E. Askin
*Attorney, Agent, or Firm*—Gifford, Groh, Sheridan, Sprinkle and Dolgorukov

[57] ABSTRACT

An adaptor for converting an electric fence post insulator from a wire electric conductor support to a tape conductor support. The adaptor connects to the wire holding fingers of the insulator.

17 Claims, 3 Drawing Sheets

ELECTRIC FENCE INSULATOR ADAPTOR AND FENCE INSULATOR COMBINED THEREWITH

This invention relates to electric fence post insulators, and, more particularly to an adaptor for supporting electric conductor tape on conventional insulators having wire engaging fingers.

There are a wide variety of wire carrying insulators available for electric fence installations on various types of posts ranging from square and round wood posts to T and U-shaped cross-section metal posts. The more successful of these insulators have a pair of wire engaging fingers which hold an electrically conductive fence wire.

With the recent availability of $\frac{3}{4}$" and $1\frac{1}{2}$" wide electric conductor tapes, it has become desirable to have electric fence insulators available to accommodate these tapes. However, the expenditure involved in providing a new family of insulators for each type of post has impeded their introduction on the market.

It is the primary purpose of this invention to provide an electric fence post insulator for supporting electrically conductive tape.

The objective of this invention has been accomplished in an adaptor having a body member with means for supporting the electric conductor tape and means for attaching the body member to the wire holding fingers of an electric fence insulator. The wire holding fingers of the insulator have aligned wire holding apertures, and the adaptor body has a pair of spaced lugs with pin receiving apertures. The lugs are so spaced to receive the wire holding fingers between them so that the wire holding apertures are aligned with the pin receiving apertures. A connecting pin is passed through the apertures to attach the adaptor body to the electric fence insulator.

Means for supporting the conductor tape includes a bracket device which restricts the lateral or vertical movement of the tape. The bracket device can include a slotted bracket member with the tape being retained in the slot A clip can snap over the bracket member to restrict the vertical movement of the tape, and the clip can also be designed to restrict horizontal movement of the tape.

The bracket device can also take the form of a pair of spaced bracket members mounted on a support panel with one of the bracket members having an upwardly opening slot and the other of the bracket members having a downwardly opening slot so as to accommodate the tape and prevent lateral or vertical movement of the tape.

In another form the bracket device of the adaptor includes a pair of vertically spaced bracket members having aligned apertures to receive a tape retaining pin. The tape is then supported between the bracket members and between the tape retaining pin and the support panel.

The preferred embodiments of the invention are illustrated in the drawing in which.

Figure 1:
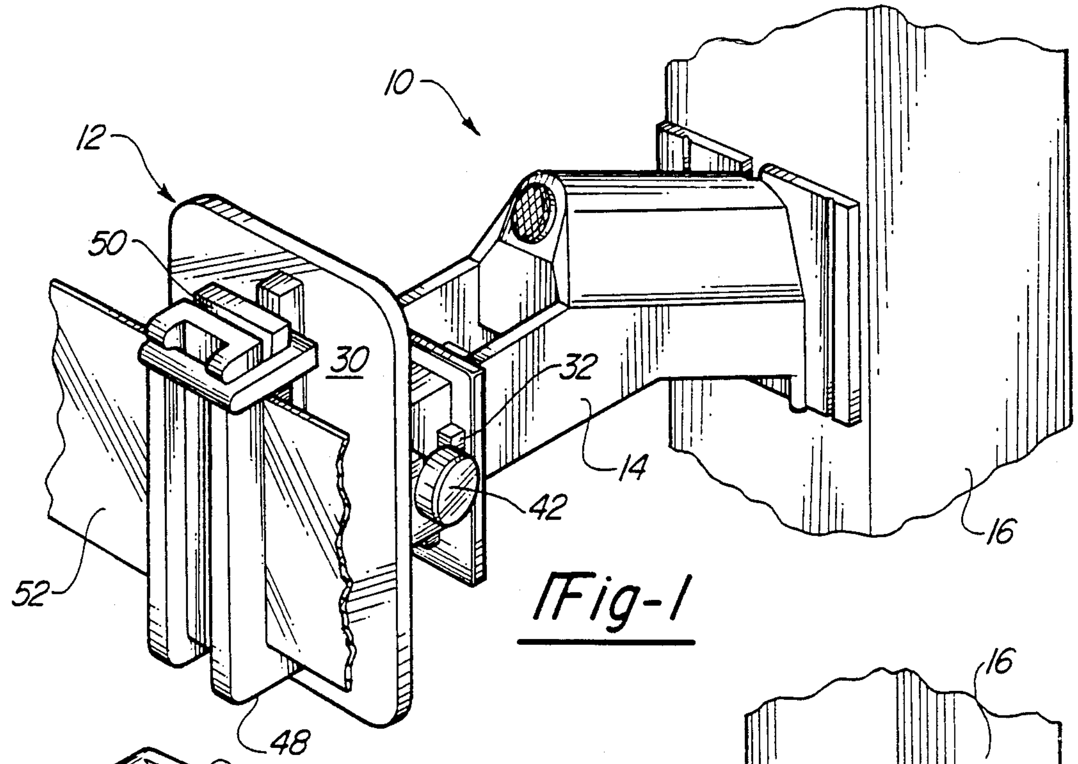
FIG. 1 is a perspective view showing the adaptor of this invention supporting an electric conductor tape with a clip in place for lateral or lateral and longitudinal restriction of the tape; the adaptor is shown affixed to a universal nail-on insulator for attachment to square or round wood fence posts.
Figure 2:
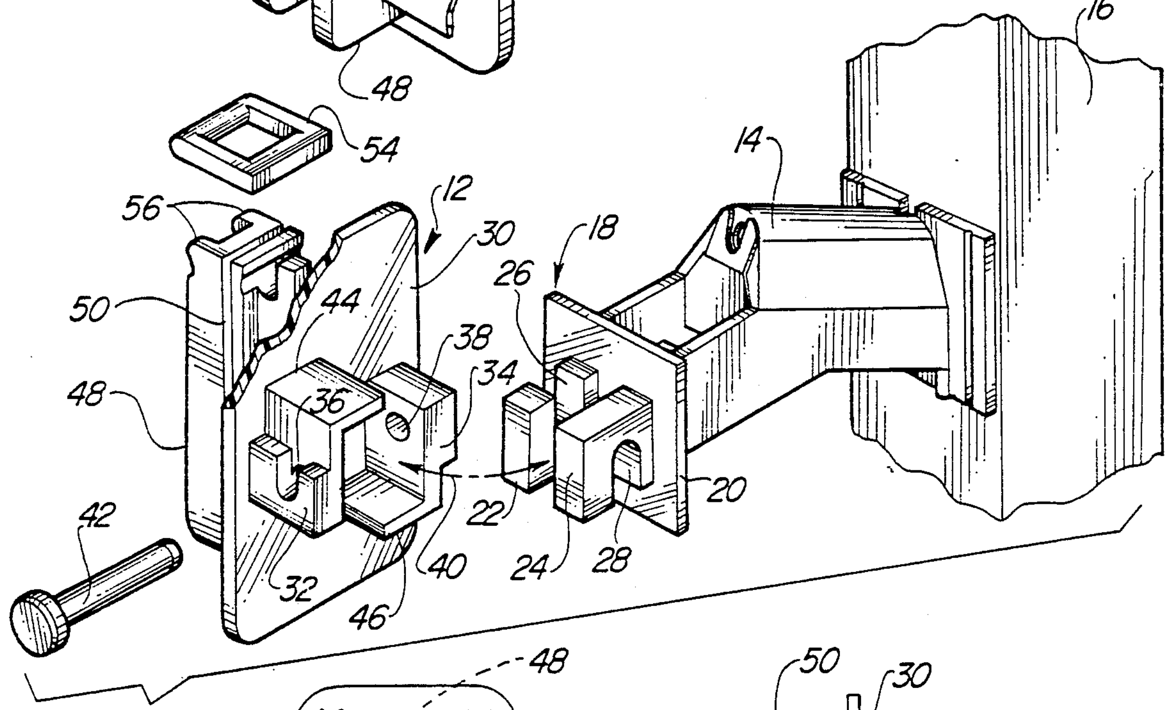
FIG. 2 is an exploded perspective view of the adaptor of FIG. 1 showing the details of the adaptor lugs and their cooperation with the wire holding fingers of the fence post insulator.

Referring to the drawing and particularly to FIGS. 1–5, the adaptor-insulator assembly 10 is shown as including an adaptor body 12 and an electric fence post insulator 14. The specific insulator is shown as a universal nail-on insulator designed to be installed on flat or round wood posts; it being shown attached to a square post 16. Details of this insulator are described in my U.S. Pat. No. 4,599,488. The method of attaching the insulator to the post or the type of post being used forms no part of my invention; however, means of holding an electric wire on the insulator is important, and it must be the same for the insulators with which the adaptor is to be used. More particularly, the wire holding means 18 at one end of the insulator 14 includes wire holding panel 20 and a pair of outwardly extending fingers 22 and 24. Finger 22 has an aperture in the form of an upwardly extending slot 26, and finger 24 has an aperture in the form of a downwardly extending slot 28. These slots or apertures normally accommodate and hold a wire as more fully set forth in the aforementioned patent, restricting movement of the wire in a vertical direction.

Figure 3:
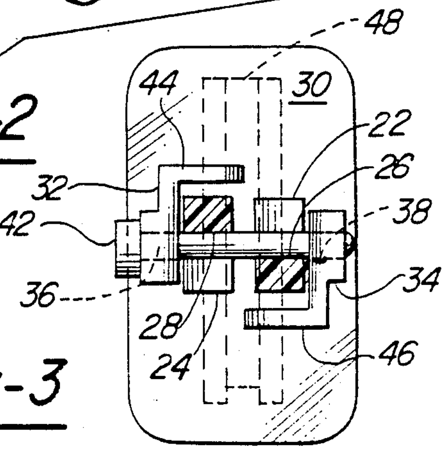
FIG. 3 is a rear elevational view partially in section of the embodiment of the invention shown in FIGS. 1 and 2 showing the details of the adaptor lugs and their coaction with the wire holding fingers shown in section and the connecting pin in place, all shown in respect to the tape holding bracket shown in dotted line.
Figure 4:
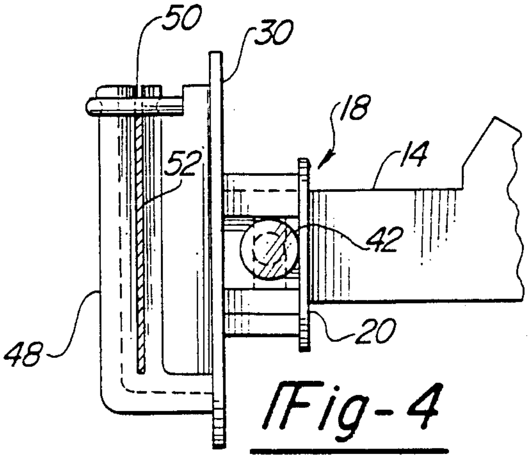
FIG. 4 is a side elevational view of the adaptor of FIGS. 1–3 showing the relationship of the tape, the tape holding bracket, and the attachment of the adaptor to the insulator.

Adaptor body 12 has a support panel 30 with a pair of lugs 32 and 34 extending outwardly from its rear face. Lugs 32 and 34 have aligned apertures 36 and 38. Adaptor 12 is attached to insulator 14 by inserting the insulator fingers 22 and 24 into the space between adaptor lugs 32 and 34 as shown by arrow 40 in FIG. 2. As shown in FIG. 3, the aligned wire receiving apertures 26 and 28 of fingers 22 and 24 are brought into alignment with aligned pin receiving apertures 36 and 38 of lugs 32 and 34 so that connecting pin 42 may be inserted for completing the attachment. The connecting pin 42 may be molded with knobs or other projections, not shown, to prevent pin removal. The lugs 32 and 34 are dimensioned with their structural ribs 44 and 46 to allow space for alignment of the fingers 22 and 24 in order to accommodate variations between these fingers which may occur between different manufacturers or types of insulators. However, with a given manufacturer and finger design, these structural ribs could be designed to abut against the fingers in the alignment process.

Figure 5:
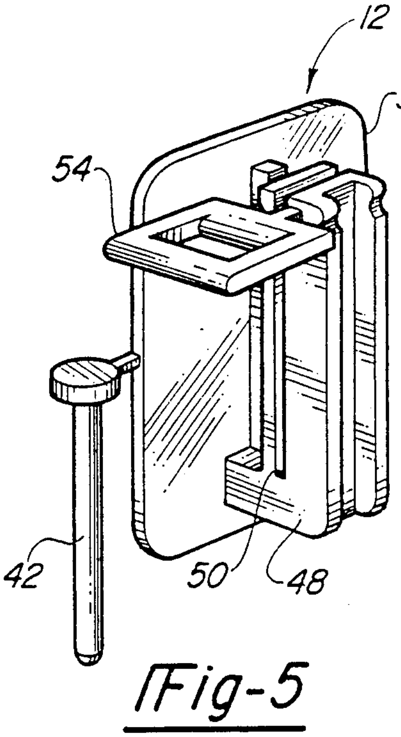
FIG. 5 is a front perspective view of the adaptor of FIGS. 1–4 showing it as molded with the connecting pin being molded attached to the support panel and the clip being molded attached to the tape holding bracket.

Bracket 48 extends outwardly from the front face of support panel 30, and it has an upwardly extending slot 50 to accommodate the electric conductor tape or ribbon 52. Snap clip 54 is adapted to snap over projections 56 at the top end of bracket 48 to restrain vertical or lateral movement of tape 52. By dimensioning the bracket 48 and clip 54, the clip may be brought into contact with the top of tape 52 to also prevent or restrict longitudinal or horizontal movement of tape 52. As shown in FIG. 5, the connecting pin 42 and restraining clip 54 can be integrally molded with the adaptor body 12 by attachment to support panel 30 and bracket 48 respectively.

In the embodiment of the invention shown in FIGS. 6–9 the adaptor body 12*a* is shown attached to an insulator 51 of the type adapted for mounting on a metal fence post 53 of T-shaped cross-section. Details of the insulator 51 and its attachment to the T-post 53 forms no part of this invention but is shown to illustrate the universal attachment of adaptor body 12*a* to various insulators. Details of this insulator are shown in my U.S. Pat. No. 4,077,611. Wire holding means 18 with its bar holding fingers 22 and 24 are the same as those illustrated in the embodiment of FIGS. 1–5, and the details of attachment will not be repeated.

Figure 6:
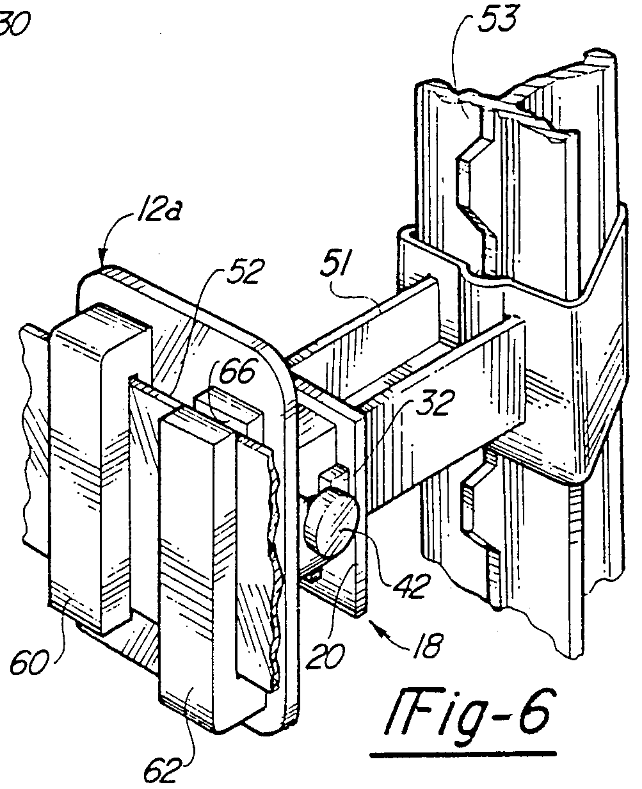
FIG. 6 is a perspective view showing a second embodiment of the adaptor of this invention supporting an electric conductor tape between two bracket members which restrict vertical movement of the tape; the adaptor being affixed to an insulator adapted for mounting on a metal post of T-shaped cross-section.
Figure 7:
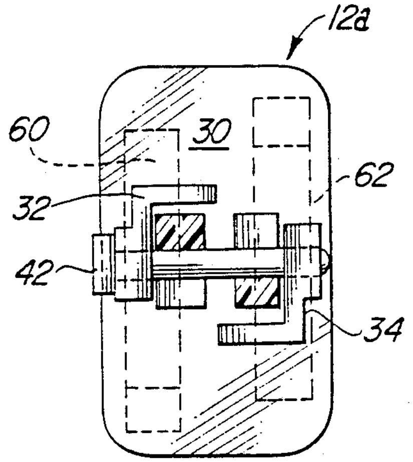
FIG. 7 is a rear elevational view partially in section of the adaptor of FIG. 6 showing the relationship between the adaptor lugs and wire holding fingers and their position in respect to the tape holding bracket members.
Figure 8:
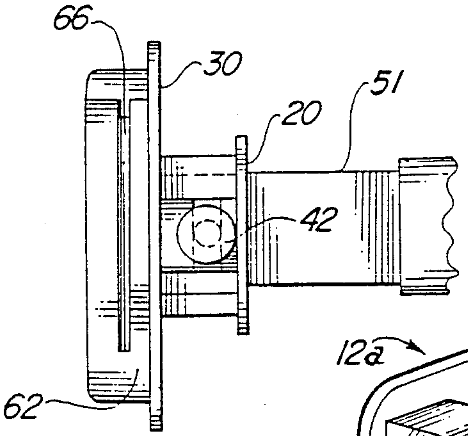
FIG. 8 is a side elevational view of the adaptor of FIGS. 6 and 7 showing the relationship of the tape, the tape holding brackets and the attachment of the adaptor to the insulator.
Figure 9:
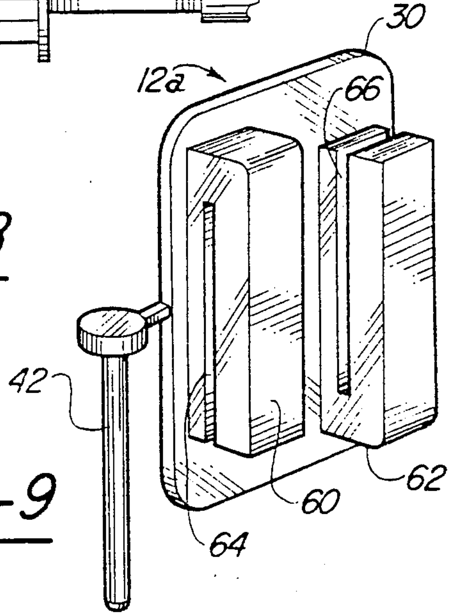
FIG. 9 is a front perspective view of the adaptor of FIGS. 6–8 showing the adaptor as molded with the connecting pin attached to the support plate.
Figure 10:
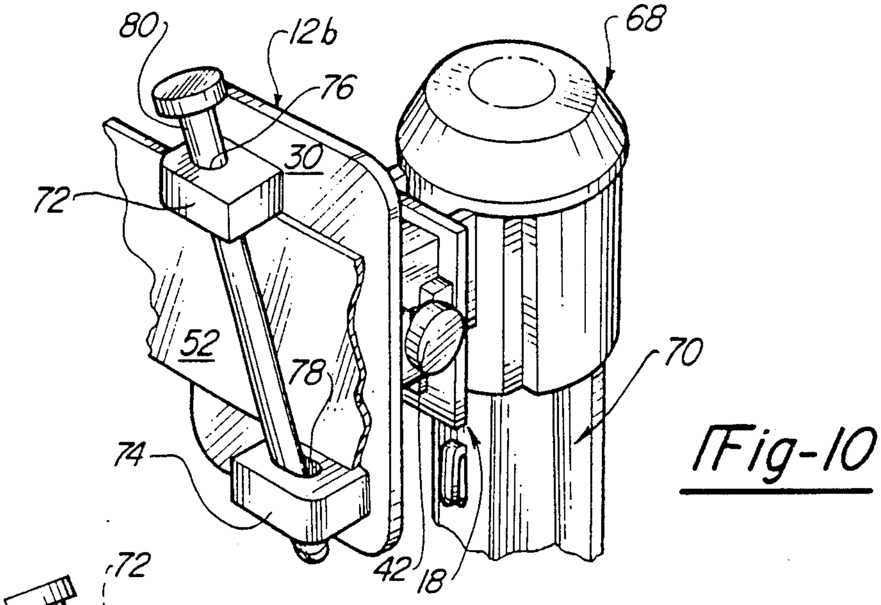
FIG. 10 is a perspective view showing a second alternative embodiment of the adaptor of this invention supporting an electric conductor tape between vertically spaced lugs confined between a tape retaining pin and the adaptor support panel; the adaptor being affixed to a fence post insulating cap for application to a metal fence post having a U-shape cross-section.
Figure 11:
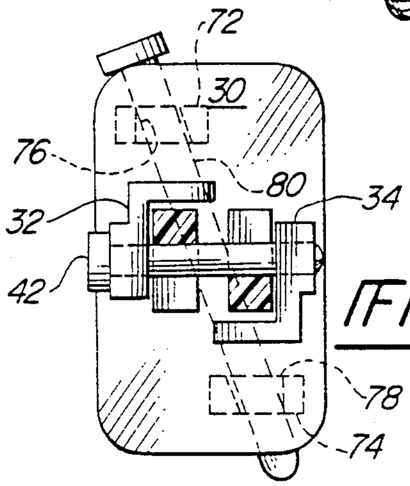
FIG. 11 is a rear elevational view partially in section of the adaptor of FIG. 10 showing the relationship of the adaptor lugs and insulator fingers with respect to the tape holding lugs and tape retaining pin.
Figure 12:
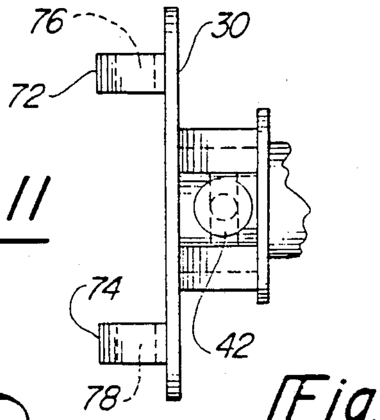
FIG. 12 is a side elevational view of the adaptor shown in FIGS. 10 and 11 showing the relationship of the tape holding lugs with the tape retaining pin removed and the attachment of the adaptor to the insulator cap.

As best seen in FIG. 9, the adaptor body 12*a* of the embodiment shown in FIGS. 6–9 has a pair of brackets 60 and 62. Bracket 60 has a downwardly opening slot 64 and bracket 62 has an upwardly opening slot 66. Tape 52 is inserted in slots 64 and 66 as shown in FIG. 6, and lateral or vertical movement is restrained. As shown in FIG. 9, the connecting pin 42 can be integrally molded as part of adaptor body 12*a* by attachment to support panel 30.

Figure 13:
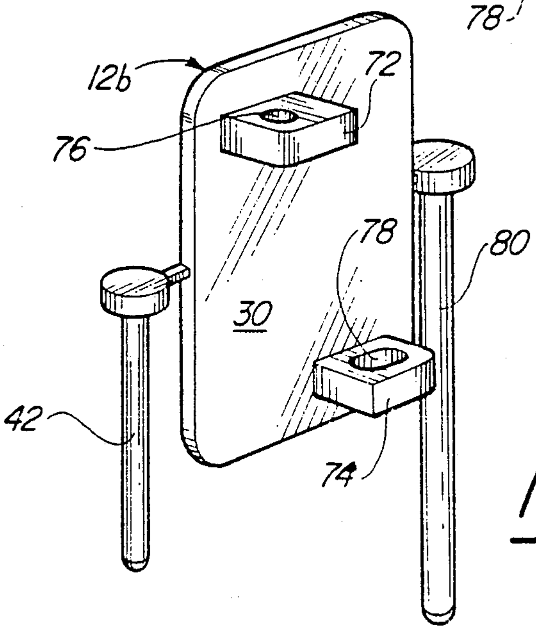
FIG. 13 is a front perspective view of the adaptor of FIGS. 10–12 showing the adaptor as molded with the connecting pin and tape retaining pin molded integrally with the support panel of the adaptor.

In the embodiment shown in FIGS. 1014 13 the adaptor body 12*b*, is shown attached to an electric insulator cap 68 which fits over the top of U-post 70. Insulator cap 68 has the same wire holding means 18 as in the former embodiments of FIGS. 1–5 and FIGS. 6–9. In this embodiment a pair of vertically spaced and horizontally displaced bracket members 72 and 74 project outwardly from the rear face of support panel 30. These brackets have aligned holes 76 and 78 to receive tape retaining pin 80. Thus, the electric conducting tape or ribbon 52 is retained and supported between bracket members 72 and 74 and is restrained between tape retaining pin 80 and the face of support panel 30. The dimensioning of brackets 72 and 74 with their apertures 76 and 78 can be such as to restrict horizontal movement as well as vertical movement of tape 52. FIG. 13 shows that the connecting pin 42 and tape retaining pin 80 can be integrally molded with adaptor body 12*b* by attachment to support panel 30.

The embodiments of the invention in which an exclusive property or privilege is claimed are defined as follows:

1. An adaptor for supporting an electric conductor tape on an electric fence insulator comprising:
   a body member;
   means on said body member for supporting an electric conductor tape; and
   means on said body member for attaching said body member to the wire holding fingers of an electric fence insulator.

2. The adaptor according to claim 1 wherein the wire holding fingers of said electric fence insulator have aligned wire holding apertures and the means for attaching said body member to said fingers include lug means extending outwardly from said body member with a pin receiving aperture therein and a connecting pin adapted to pass through said wire holding apertures and pin receiving aperture when said lug means is aligned with said fingers.

3. The adaptor according to claim 2 wherein said lug means include a pair of spaced parallel lugs with aligned pin receiving apertures, and said lugs are aligned with said fingers therebetween to receive said connecting pin through said wire holding and pin receiving apertures.

4. The adaptor according to claim 1 wherein said means for supporting said electric conductor tape includes bracket means which restricts lateral movement of said tape.

5. The adaptor according to claim 4 wherein said body member includes a support panel upon which said bracket means is located.

6. The adaptor according to claim 5 wherein said bracket means includes a slotted bracket member for receiving said tape.

7. The adaptor according to claim 6 further including a clip which snaps over said bracket member to restrict lateral movement of the tape.

8. The adaptor according to claim 5 wherein said bracket means includes a pair of spaced bracket members mounted on said support panel, one of said bracket members having an upwardly opening slot and the other of said bracket members having a downwardly opening slot to accommodate said tape and prevent lateral movement thereof.

9. The adaptor according to claim 5 wherein said bracket means includes a pair of vertically spaced bracket members having aligned apertures receiving a tape retaining pin for supporting and laterally restricting said tape between said bracket members and between said tape retaining pin and said support panel.

10. An adaptor for supporting an electric conductor tape on an electric fence insulator, said insulator having wire holding fingers with aligned wire holding apertures comprising:

a body member including a support panel having a generally vertical position in use;

a pair of spaced lugs extending outwardly from one side of said support panel with aligned pin receiving apertures, said lugs being spaced to receive said wire holding fingers therebetween with the wire holding apertures aligned with said pin receiving apertures;

a connecting pin adapted to pass through said pin receiving and wire holding apertures for attaching said body member to said insulator; and bracket means extending outwardly from the other side of said support panel for supporting said tape in a plane generally parallel to said panel while preventing vertical movement thereof.

11. The adaptor according to claim 10 wherein said bracket means includes a slotted bracket member for receiving said tape and a clip member which snaps over said bracket member to restrain vertical movement of said tape.

12. The adaptor according to claim 11 wherein said clip prevents horizontal movement of said tape.

13. The adaptor according to claim 10 wherein said bracket means includes a pair of spaced bracket members mounted on said support panel, one of said bracket members having an upwardly opening slot and the other of said bracket members having a downwardly opening slot to accommodate said tape and prevent vertical movement thereof.

14. The adaptor according to claim 10 wherein said bracket means includes a pair of vertically spaced bracket members having aligned apertures receiving a tape retaining pin for supporting and vertically restricting said tape between said bracket members and between said tape retaining pin and said support panel.

15. The adaptor according to claim 14 wherein said tape retaining pin restricts horizontal movement of said tape.

16. An electric fence post insulator for supporting an electric conductor tape comprising, in combination:

an electric fence post insulator having means for attachment to a fence post and a pair of wire holding fingers; and an adaptor having bracket means for supporting said electric conductor tape and means for attachment to said wire holding fingers.

17. The insulator according to claim 16 wherein said wire holding fingers have aligned wire holding apertures and said means for attachment to said wire holding fingers includes a connecting pin passing through said apertures.

* * * * *